United States Patent Office 3,580,889
Patented May 25, 1971

3,580,889
VULCANIZATION ACCELERATORS OF POLY-
CYCLIC ETHERS FOR FLUORINATED POLYMERS
Arthur Livingston Barney and Wolfgang Honsberg, Wilmington, Del., assignors to E. I. du Pont de Nemours and Company, Wilmington, Del.
No Drawing. Continuation-in-part of abandoned applications Ser. No. 661,230, Aug. 17, 1967, and Ser. No. 731,325, May 22, 1968. This application Feb. 25, 1969, Ser. No. 802,236
Int. Cl. C08f 7/10, 3/20, 19/00
U.S. Cl. 260—47
17 Claims

ABSTRACT OF THE DISCLOSURE

The acceleration of the vulcanization of saturated, fluorinated polymers by the use of cyclic polyethers. The accelerators enable a more rapid cure with conventional amine-based vulcanization systems and also enable a satisfactory rate and state of cure with weakly basic bis-nucleophiles otherwise incapable of adequately curing fluorinated polymers.

CROSS REFERENCE TO RELATED APPLICATION

This application is a continuation-in-part of applicants' copending applications Ser. No. 661,230, filed Aug. 17, 1967 and Ser. No. 731,325, filed May 22, 1968, both now abandoned.

BACKGROUND OF THE INVENTION (1) Field of the invention

This invention relates to the vulcanization of fluorinated polymers and, more particularly, it relates to vulcanizable compositions containing such polymers.

(2) Description of the prior art

The vulcanization of saturated, fluorinated elastomeric polymers is well known. A wide variety of amine-based vulcanization systems have been developed. It is frequently desirable, however, to accomplish the state of cure desired in a shorter time. Moreover, it is sometimes desirable to be able to use as curing agents certain compounds presently somewhat unsatisfactory for that purpose either from a time-delay standpoint or from the ultimate state of cure obtainable therewith.

SUMMARY OF THE INVENTION

In the vulcanization of saturated, fluorinated elastomeric polymers, the improvement of adding to said polymers before vulcanization up to about 5 parts per 100 parts of polymer, of a cyclic polyether consisting of about 4 to 10 —O—X— units and —O—Y— units wherein X and Y are divalent radicals independently selected from the group consisting of:

(a)
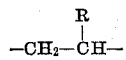

(b)
(c)
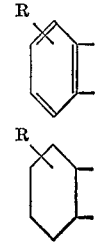

wherein R is hydrogen or methyl and wherein at least one of X and Y is (a).

DETAILED DESCRIPTION OF THE INVENTION

This invention is applicable to saturated interpolymers of vinylidene fluoride ($VF_2$) with other fluorine-containing ethylenically unsaturated monomers copolymerizable therewith. Typical of the latter are hexafluoropropene (HFP), tetrafluoroethylene (TFE), perfluoroalkyl perfluorovinyl ethers [particularly where the alkyl radical contains from 1 to about 4 carbon atoms such as perfluoro(methyl vinyl ether) and perfluoro(propyl vinyl ether)], trifluorochloroethylene, and pentafluoropropylene. Of particular interest are the vinylidene fluoride/hexafluoropropene copolymers containing from about 70 to about 30 weight percent vinylidene fluoride and 30 to about 70 weight percent hexafluoropropene (see Rexford, U.S. Pat. 3,051,677). Other important polymers are the terpolymers of vinylidene fluoride/hexafluoropropene/tetrafluoroethylene wherein the monomer units are present in the following mole ratios: about 3 to 35 (preferably 15 to 25) weight percent tetrafluoroethylene units and about 97 to 65 (preferably 85 to 75) weight percent vinylidene fluoride and hexafluoropropene units, the latter two being present in a weight ratio of from about 2.5:1 to 0.5:1 (see Pailthorp & Schroeder, U.S. Pat. 2,968,649).

Other vinylidene fluoride polymers and their preparation are disclosed in Dittman et al., U.S. Pats. 2,738,343 and 2,752,331; Hanford & Roland, U.S. Pat. 2,468,664; Brubaker, U.S. Pat. 2,393,967; and Honn et al., U.S. Pats. 2,833,752 and 2,965,619.

Fluorinated polymers not derived from vinylidene fluoride such as interpolymers of tetrafluoroethylene with perfluoro(alkyl vinyl ethers) can be employed.

As used herein the term "saturated" means the substantial absence of addition-polymerizable carbon-to-carbon double bonds; it does not preclude the presence of small amounts (e.g., up to about 5 weight percent) of perfluoroaromatic side chain groups (e.g., perfluorophenyl) on the polymer. For example, interpolymers of tetrafluoroethylene and perfluoro(alkyl vinyl ethers) can have up to about 5 weight percent of units of perfluoro (2-phenoxypropyl vinyl ether) present.

Cyclic polyethers can be prepared in accordance with the teachings of assignee's U.S. application of Pedersen, Ser. No. 588,302, filed Oct. 21, 1966, and its parent application (both now abandoned). Therein many suitable cyclic polyethers are listed. Representative compounds are those consisting of 4 to 10, preferably 4 to 6, —O—X— and —O—Y— units wherein X and Y are

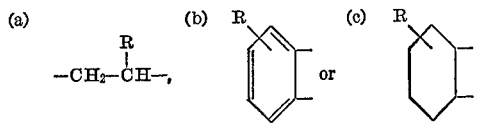

wherein R is hydrogen or methyl and wherein at least one of X and Y is (a). It is to be understood that in (b) or (c), when R is methyl, it replaces one of the hydrogens bonded to the ring carbon atoms. Radicals (b) or (c) should be separated by at least one (a) radical, i.e., when X is (a) and Y is (b) or (c), each —O—Y— unit is joined at both ends to an —O—X— unit.

Representative cyclic ethers, also called "crowns" because of the appearance of their structural formulas, are as follows:

(I)

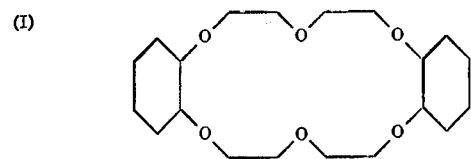

2,5,8,15,18,21-hexaoxatricyclo[20.4.0.0$^{9,14}$]hexacosane (II)

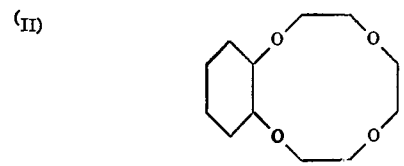

2,5,8,11-tetraoxabicyclo[10.4.0]hexadecane (III)

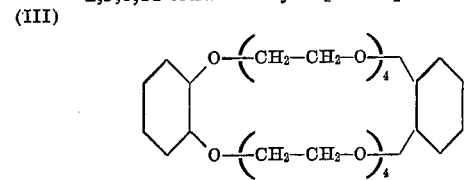

2,5,8,11,14,21,24,27,30,33-decaoxatricyclo-
[32.4.0.0$^{15,20}$]octatriacontane (IV)

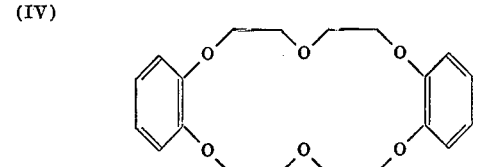

2,3,11,12-dibenzo-1,4,7,10,13,16-hexa-
oxacyclooctadeca-2,11-diene (V)

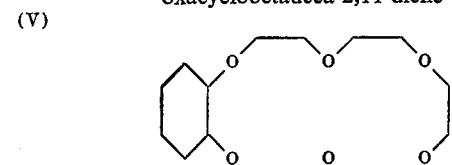

2,5,8,11,14,17-hexaoxabicyclo[16.4.0]docosane

The above crown compounds can be prepared in accordance with the above-identified Pedersen application; the preparation of crown (I) appears on pages 36 and 37, crown (III) on page 43, crown (IV) on pages 29 to 31, crown (V) on pages 54 to 56, and crown (II) can be prepared by producing the aromatic precursor as set forth on pages 40 to 41 with hydrogenation as set forth for crown (V).

(VI)

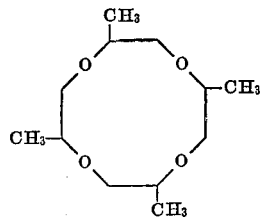

1,4,7,10 - tetraoxa - 2,5,8,11 - tetramethylcyclododecane (called propylene oxide tetramer). It can be prepared according to Down et al., J. Chem. Soc. [London, 3767 (1959)].

Representative of other crowns are: crown IV having a t-butyl substituent on each benzenoid ring, and

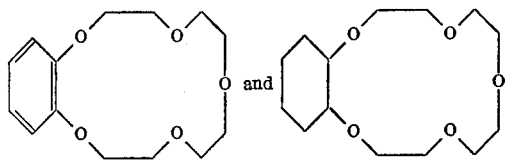

The above can be prepared in accordance with the above-identified application of Pedersen.

The amine-based vulcanization of saturated, fluorinated polymers, especially VF$_2$ copolymers, is well known to those skilled in the art. Frequently used are the organic aliphatic diamines, e.g., ethylene diamine or hexamethylene diamine, or their carbamates. The subject has been discussed and explained in publications, such as J. F. Smith, "The Chemistry of Vulcanization of Viton—a Fluorocarbon Elastomer," Proceedings of International Rubber Conference, pp. 575–581, Washington, November 1959; and Paciorek et al., "Mechanism of Amine Crosslinking of Fluoroelastomers," J. Poly. Sci., vol. XLV, pp. 405, 413 (1960). Although spoken of as amine-based curing, the amines may be used as carbamates, hydrochlorides, oxalates, or reaction products with hydroquinone. Many amine-based systems have been devised to produce special effects using primary, secondary and tertiary amines, aliphatic and aromatic, alone or in combination with other amines. Hydrazine and its derivatives have also been used in such systems.

Amine-based vulcanizations are the subject of many patents, e.g., West, U.S. 2,793,200; Rugg, U.S. 2,933,481; West, U.S. 2,979,490; Smith, U.S. 3,008,916; Griffin, U.S. 3,041,316; and Davis et al., U.S. 3,071,565.

The accelerators of this invention also enable the rapid and satisfactory vulcanization of saturated, fluorinated polymers by using poly(nucleophiles) in a weakly basic system. Such agents have not heretofore provided adequate cure rates or ultimate states of cure. Representative are bis(nucleophiles) such as dihydroxy aromatic compounds, such as 2,2-bis(4-phenylol)propane (bisphenol-A), 2,2-bis(4-phenylol)perfluoropropane (bisphenol AF), resorcinol, 1,7-dihydroxynaphthalene, 4,4'-dihydroxydiphenyl, 4,4'-dihydroxystilbene, 2,6-dihydroxyanthracene, hydroquinone, or their alkali or alkaline earth metal salts; lower aliphatic diols, e.g., 1,3-propanediol and 1,6-hexanediol; dithiols, such as p-xylylyldithiol; various weakly basic aromatic diamines like methylenedianiline, o-, m- and p-phenylenediamine; and bis-hydrazinium oxalate. Other polynucleophiles include pentaerithritol, diphenylsilanediol, 1,3,5-trihydroxybenzene and aminophenol. The various nucleophilic groups need not be the same.

The accelerators of this invention also enable curing with compounds such as borates, carbonates, phosphates.

The accelerators of this invention are normally used in the presence of basic divalent metal oxides such as MgO, CaO, ZnO, PbO, Pb$_3$O$_4$, BaO and basic metal hydroxides such as Mg(OH)$_2$, Ca(OH)$_2$, Ba(OH)$_2$ and Sr(OH)$_2$. The latter may be used to form complexes with the crowns before use. In those cases where polynucleophiles other than aliphatic amines are used, it is frequently useful to adjust the basicity of the system further by including 0.1 to 20 equivalents per equivalent of nucleophilic functional group of an alkali or alkaline earth metal salt of an acidic organic compound such as a carboxylic acid, phenol or thiophenol, or an alkali metal salt of an inorganic acid of comparable acid strength. Alternatively, a performed alkali or alkaline earth metal salt, preferably the monometallic salt, of the polynucleophile itself may be used. Representative examples of the salts which may be used are sodium stearate, lithium benzoate, potassium acetate, potassium 2,4,6-trichlorophenate and the potassium salt of pentachlorothiophenol.

This invention is particularly useful because it offers routes to faster vulcanization with lower amounts of polyamine compound, thus reducing cost and reducing the amounts of excess polyamines which are believed to be deleterious for best heat resistance. The accelerator compounds of this invention also enable the use of various materials as curing agents which could not be satisfactorily employed alone. It has been found that the accelerator compounds of this invention do not by themselves effect curing even when as much as 5 parts are used.

The invention will now be described in relation to examples of specific embodiments thereof wherein parts and percentages are by weight unless otherwise specified.

(A) Procedure for compounding, vulcanizing and testing fluorine-containing copolymers.—On a cool, 2-roll rubber mill 100 parts of vinylidene fluoride and hexafluoropropene containing 60 to 40 weight percent, respectively are compounded with 20 parts of medium thermal carbon black and 15 parts of magnesium oxide.[1] Except as noted, 135 parts of this composition are used for further compounding with the vulcanizing agents and accelerators described in the examples. The compositions are sheeted off the mill and specimens for physical testing are prepared. An oscillating disc rheometer (ODR) is used to determine rapidity of cure after selected times that a test piece is held at curing conditions. The ODR measures the relative viscosity of an elastomer by oscillating a grooved conical disc which is pressed tightly between two test pieces. The disc moves through 3 degrees of arc and oscillates at 900 c.p.m. The amount of torque required to oscillate the disc is reported as the measure of viscosity.

Vulcanizates are prepared by compression molding of appropriate samples in a press for 30 minutes at 163° C. followed by removing them from the mold and "postcuring" by heating in an air oven to 204° C. over a 4-hour period and then an additional 24 hours at this temperature.

EXAMPLE 1

"Crown" Compound (I) as accelerator for hexamethylene diamine carbamate (HMDAC)

Procedure A is followed using the above vulcanization system.

| | | | |
|---|---|---|---|
| Parts of "crown" Compound (I) | [1] 0 | 1 | 5 |
| Parts of HMDAC | 1.5 | 1.5 | 1.5 |

[1] Outside the invention—for comparison only.

OSCILLATING DISC RHEOMETER AT 160° C.
(Inch pounds of torque)

| After minutes: | | | |
|---|---|---|---|
| 2.5 | 4 | 42 | 66 |
| 5 | 10 | 76 | 82 |
| 10 | 40 | 98 | 90 |
| 20 | 56 | 106 | 96 |

Physical properties measured at 25° C.

[1] Magnesium oxide having an iodine number of about 43.

AFTER PRESS VULCANIZATION AT 163° C.

| | | | |
|---|---|---|---|
| Modulus at 100% elongation, p.s.i | 500 | 825 | 650 |
| Tensile strength, p.s.i | 1,700 | 1,250 | 1,200 |
| Elongation at break, percent | 215 | 150 | 160 |
| Permanent set at break, percent | 4 | 3 | 2 |
| Compression set 22 hours at 70° C., percent | 24 | 14 | 13 |

AFTER POSTCURE AT 204° C.

| | | | |
|---|---|---|---|
| Modulus at 100% elongation, p.s.i | 950 | 1,500 | 1,500 |
| Tensile strength, p.s.i | 1,925 | 1,850 | 2,050 |
| Elongation at break, percent | 160 | 115 | 140 |
| Permanent set at break, percent | 2 | 4 | 2 |
| Compression set 22 hours at 70° C., percent | 15 | 9 | 7 |

EXAMPLE 2

"Crown" Compound (I) as accelerator for amines

Procedure A is followed using the following vulcanizing systems:

| | | | | | | |
|---|---|---|---|---|---|---|
| Parts of crown compound (I) | [1] 0.7 | 5 | [1] 0 | 5 | [1] 0 | 2 |
| Parts of hydrazine derivative [2] | 1.3 | 1.3 | | | | |
| Parts of p-phenylenediamine | | | 1.5 | 1.5 | | |
| Parts of tetramethyl ammonium chloride | | | | | 1.6 | 1.6 |

[1] Outside the invention—for comparison only.
[2] Prepared by stirring mixture of 20 parts of hydrazine hydrate and 284 parts of diethylamine in a closed vessel at room temperature under a CO$_2$ atmosphere.

OSCILLATING DISC RHEOMETER AT 160° C.
(Inch pounds of torque)

| After minutes: | | | | | | |
|---|---|---|---|---|---|---|
| 5 | 2 | 35 | 3 | 4 | 2 | 19 |
| 5 | 2 | 48 | 4 | 6 | 2 | 25 |
| 10 | 2 | 56 | 4 | 10 | 2 | 33 |
| 20 | 7 | 63 | 4 | 18 | 4 | 41 |
| 60 | 20 | 73 | 4 | 50 | 8 | 58 |

EXAMPLE 3

Vulcanization of a fluorine-containing terpolymer

Procedure A is followed except the copolymer is a vinylidene fluoride, tetrafluoroethylene, hexafluoropropylene copolymer containing the following respective weight percentages: 45, 30 and 25. Hexamethylenediamine carbamate (1.5 parts) is accelerated with 1 part of crown compound (I), for vulcanization.

OSCILLATING DISC RHEOMETER AT 160° C.
(Inch pounds of torque)

| | Accelerated compound [No. Crown (I)] | Control [1] |
|---|---|---|
| After minutes: | | |
| 2.5 | 18 | 11 |
| 5 | 55 | 12 |
| 10 | >100 | 25 |

[1] Outside the invention—for comparison only.

Physical properties measured at 25° C.

AFTER PRESS VULCANIZATION AT 163° C.

| | | |
|---|---|---|
| Modulus at 100% elongation, p.s.i | 1,150 | 540 |
| Tensile strength, p.s.i | 1,525 | 2,525 |
| Elongation at break, percent | 130 | 265 |
| Compression set 22 hours at 70° C., percent | 6 | 20 |
| Hardness durometer A | 72 | 68 |

AFTER POSTCURE AT 204° C.

| | | |
|---|---|---|
| Modulus at 100% elongation, p.s.i | 1,300 | 650 |
| Tensile strength, p.s.i | 2,100 | 2,575 |
| Elongation at break, percent | 135 | 195 |
| Compression set 70 hours at 70° C., percent | 7 | 18 |
| Hardness durometer A | 75 | 70 |

EXAMPLE 4

Various "crown" compounds as accelerators for hexamethylenediamine carbamate (HMDAC)

Procedure A is followed using 3 parts of HMDAC as the vulcanizing agent, accelerated with 1 part of the following crown compounds:

Crown: (II), (III), (IV), (V), Control [2] (no "crown")

OSCILLATING DISC RHEOMETER AT 160° C.
(Inch pounds of torque)

| After minutes: | | | | | |
|---|---|---|---|---|---|
| 2.5 | 14 | 7 | 20 | 50 | 5 |
| 5 | 84 | 82 | 100 | 120 | 59 |

EXAMPLE 5

Acceleration with low concentrations of "crown" (I) or low concentration of hexamethylenediamine carbamate (HMDAC)

Procedure A is followed using the following system:

| | | | | |
|---|---|---|---|---|
| Parts of crown (I) | [1] 0 | 1 | 0.25 | 0.5 |
| Parts of HMDAC | 0.25 | 0.25 | 1.5 | 1.5 |

[1] Outside the invention—for comparison only.

Physical properties measured at 25° C. on vulcanizates postcured at 204° C.

| | | | | |
|---|---|---|---|---|
| Modulus at 100% elongation, p.s.i. | 180 | 300 | 825 | 1,050 |
| Tensile strength, p.s.i. | 550 | 2,400 | 2,050 | 1,975 |
| Elongation at break, percent | 845 | 325 | 160 | 165 |
| Permanent set at break, percent | 130 | 8 | 4 | 3 |
| Compression set 22 hours at 70° C., percent | ([1]) | 23 | 10 | 7 |
| Hardness durometer A | ([1]) | 64 | 69 | 70 |

[1] Not tested—specimens porous.

EXAMPLE 6

Effect of metal oxides

Procedure A is repeated using 1.5 parts HMDAC and 15 parts of an oxide as identified below instead of MgO.

| | Parts of Crown I | Oscillating disc rheometer at 160° C., min. | | | |
|---|---|---|---|---|---|
| | | 2.5 | 5 | 10 | 30 |
| ZnO control [1] | None | 2 | 2 | 10 | 49 |
| ZnO | 1 | 13 | 50 | 70 | 83 |
| PbO control [1] | None | 2 | 7 | 28 | 44 |
| PbO | 1 | 45 | 49 | 58 | 57 |
| Pb$_3$O$_4$ control [1] | None | 3 | 9 | 35 | 47 |
| Pb$_3$O$_4$ | 1 | 23 | 53 | 62 | 65 |
| BaO control [1] | None | 4 | 34 | 55 | 56 |
| BaO | 1 | 60 | 91 | 88 | 82 |

[1] Outside the invention—for comparison only.

EXAMPLE 7

Procedure A is repeated using 5 parts of Crown I and the following curing agents:

| Curing agent | Parts | Modulus at 100% elongation | Tensile strength | Elongation, percent | Permanent set, percent |
|---|---|---|---|---|---|
| H$_3$BO$_3$ | 2.4 | 650 | 2,175 | 280 | 13 |
| Na$_2$CO$_3$ | 2.6 | 600 | 1,750 | 200 | 3 |

EXAMPLE 8

Procedure A is repeated adding 2 parts Mg(OH)$_2$ and 1 part of Crown I plus a bis(nucleophile) of the type and amount listed below:

| Bis-nucleophile | Parts | M$_{100}$ | T$_B$ | E$_B$ | Permanent set | Mooney Scorch, minimum to 10-pt. rise at 121° C. |
|---|---|---|---|---|---|---|
| Phenols: | | | | | | |
| bis-phenol A | 2 | 300 | 2,340 | 390 | 13 | >45 |
| bis-phenol A [1] | 2 | 800 | 2,470 | 200 | 4 | >45 |
| bis-phenol AF | 2 | 650 | 2,350 | 210 | 3 | >45 |
| bis-phenol AF [2] | 2 | 400 | 2,640 | 280 | 6 | >45 |
| Resorcinol | 1.5 | 870 | 1,500 | 140 | 2 | >45 |
| 1,7-dihydroxynapththalene | 2 | 430 | 2,760 | 310 | 9 | >45 |
| 4,4'-dihydroxydiphenyl | 2 | 390 | 2,600 | 340 | 10 | >45 |
| 4,4'-dihydroxystilbene | 2 | 400 | 2,620 | 310 | 9 | >45 |
| 2,6-dihyroxyanthracene | 2 | 230 | 1,890 | 680 | 49 | >45 |
| Hydroquinone | 1.25 | 350 | 2,060 | 280 | 5 | <45 |
| Dithiols: p-Xylylyldithiol | 1 | 500 | 2,160 | 250 | 3 | 5 |
| Aliphatic diols: | | | | | | |
| 1,3-propanediol | 2 | 590 | 2,600 | 360 | 12 | >45 |
| 1,6-hexanediol | 2 | 380 | 2,400 | 420 | 15 | >45 |
| Aromatic amines: | | | | | | |
| Methylenedianiline | 2 | 1,530 | 2,600 | 150 | 3 | |
| o-Phenylenediamine [2] | 4 | 1,450 | 2,400 | 140 | 5 | >45 |
| m-Phenylenediamine [2] | 4 | 2,250 | 2,400 | 110 | 2 | >45 |
| p-Phenylenediamine [2] | 4 | | 1,800 | 30 | 1 | 33 |
| Hydrazine: Bis-hydrazinium oxalate | 1 | 1,220 | 2,650 | 160 | 1 | 5 |

[1] Instead of Mg(OH)$_2$ and crown, 2 parts of a complex is used prepared by dissolving 0.003 mole (11.2 g.) of crown I and 0.003 mole (9.45 g.) Ba(OH)$_2$·8H$_2$O in 150 ml. methanol, evaporating the methanol, adding 2 ml. benzene and drying to a solid under vacuum.
[2] No Mg(OH)$_2$ is used.

EXAMPLE 9

A copolymer of about 60% TFE and about 40% perfluoro(methyl vinyl ether) can be crosslinked by compounding as in Procedure A with triethylenetetramine-CO$_2$ reaction products (4 parts) and crown I (1.33 parts) and 4 parts BaO. The compression molding is conducted for at least 2 hours at temperatures at least 250° C.

EXAMPLE 10

Crown I can be used as an accelerator for Na$_3$PO$_4$ by following Procedure A with 0.5 part of crown I and 10 parts of Na$_3$PO$_4$·12H$_2$O. Press cure is at 177° C. for 30 minutes with standard postcure. Representative vulcanizate properties are as follows:

| | |
|---|---|
| Tensile strength at break, p.s.i. | 2100 |
| Elongation at break, percent | 10 |
| Permanent set at break, percent | 2 |
| Hardness—Durometer A | 95 |
| Compression set 22 hours at 70° C., percent | 49 |

EXAMPLE 11

Crown VI can be used as an accelerator in accordance with Procedure A by using 1 part of Crown VI and 3 parts of HMDAC. Typical ODR measurements (in inch pounds) at 160° C. are:

| | Accelerated compound | No acceleration[1] |
|---|---|---|
| After minutes: | | |
| 2.5 | 9 | 5 |
| 5 | 81 | 59 |
| 15 | 128 | 124 |

[1] Outside the invention—for comparison only.

EXAMPLE 12

If Procedure A is conducted using 1.25 parts of Crown I together with 1.25 parts of one of the following polynucleophiles: (a) pentaerythritol, or (b) 1,3,5-trihydroxybenzene (commonly referred to as phloroglucinol), typical vulcanizate properties are as follows:

|   | (a) | (b) |
|---|---|---|
| Modulus at 100% elongation, p.s.i. | 580 | 440 |
| Tensile strength at break, p.s.i. | 2,240 | 1,630 |
| Elongation at break, percent | 270 | 280 |
| Permanent set at break, percent | 8 | 10 |

EXAMPLE 13

Procedure A is followed except as indicated below using a copolymer/crown mixture of 100 parts of the terpolymer of Example 3 and 1.7 parts of crown I.

|   | (a) | (b) | (c) |
|---|---|---|---|
| Copolymer/crown mixture | 100 | 100 | 100 |
| Magnesium oxide [1] | 10 | 10 | 10 |
| MT carbon black | 20 | 20 | 20 |
| Barium oxide | 1 |  |  |
| Calcium hydroxide |  | 0.75 |  |
| Barium carbonate |  |  | 3 |
| Hydroquinone, pulverized | 2 | 2 | 2 |
| Mooney Scorch at 121° C. (small rotor): |  |  |  |
|   Minimum | 48 | 55 | 51 |
|   Minutes to a 5-point rise | [2] 2 | 18 | [2] 1 |
| ODR at 163° C.—Torque, in lbs.: |  |  |  |
|   0 minutes | 14 | 14 | 14 |
|   2.5 minutes | 9 | 10 | 10 |
|   10 minutes | 9 | 17 | 10 |
|   20 minutes | 13 | 27 | 15 |
|   30 | 18 | 33 | 21 |
| Stress/strain at 24° C.:[3] |  |  |  |
|   100% modulus, p.s.i. | 410 | 590 | 500 |
|   Tensile strength at break, p.s.i. | 1750 | 2,025 | 1,950 |
|   Elongation at break, percent | 290 | 290 | 260 |
|   Hardness, durometer A | 70 | 70 | 70 |
| Stress/Strain at 24° C.:[4] |  |  |  |
|   100% modulus, p.s.i. | 200 | 250 | 250 |
|   Tensile strength at break, p.s.i. | 680 | 700 | 850 |
|   Elongation at break, percent | 435 | 400 | 325 |
|   Hardness, durometer A | 70 | 69 | 68 |
|   Weight loss, percent | 4.77 | 5.12 | 5.27 |
| Compression set—Method B, percent: |  |  |  |
|   After Postcure at 204° C.: |  |  |  |
|     70 hrs./24° C. | 8.4 | 6.9 | 4.9 |
|     70 hrs./204° C. | 34.6 | 37.4 | 38.5 |
|   After postcure at 260° C.: |  |  |  |
|     22 hrs./204° C. | 6.6 | 7.9 | 6.4 |
|     70 hrs./204° C. | 13.6 | 14.6 | 13.6 |

[1] MgO having an iodine number of 125 is used.
[2] Points in 45 minutes.
[3] After press and postcures.
[4] After press and postcures and after aging 16 hours in 316° C. oven.

EXAMPLE 14

A copolymer[3] of 51% TFE, 46% perfluoro(methyl vinyl ether), and 3% perfluoro(2-phenoxypropyl vinyl ether) is compounded on a 2-roll rubber mill heated to 50–60° C. with the listed ingredients and thoroughly mixed for 15 minutes. Test pieces are cut and cured in a press for 30 minutes at 160° C. These are then "post-cured" in an air-circulating oven according to a schedule which is typically 24 hours at 160° C., 24 hours at 180° C. and 24 hours at 204° C. The physical properties are determined by standard tests. (ASTM D-412)

| Materials | Parts | | | | |
|---|---|---|---|---|---|
|   | A | B | C | D | E |
| Fluoroelastomer | 30 | 30 | 50 | 75 | 75 |
| MT carbon black | 6 | 6 |  | 15 | 15 |
| SAF carbon black |  |  | 7 |  |  |
| MgO |  |  | 2 | 3 |  |
| CaO | 1 | 1 |  |  | 3 |
| BaO | 1 | 1 |  |  |  |
| Ba complex of crown I [1] | 2 | 2 |  |  |  |
| Crown I |  |  | 2 | 3 | 3 |
| Hydroquinone |  |  | 0.3 |  |  |
| Bisphenol AF |  |  | 0.6 |  |  |
| Potassium half-salt of bisphenol AF [2] |  |  |  | 1.0 |  |
| Potassium salt of bisphenol AF [2] |  |  |  |  | 2 |
| Calcium salt of bisphenol AF [2] |  |  |  |  | 2.5 |

[1] 20 g. Ba(OH)$_2$.H$_2$O and 20 g. crown I in 100 ml. methanol is stirred for 16 hours under nitrogen. The solid complex is filtered off and dried.
[2] The salts are prepared by heating enough of the metal hydroxide to make the desired salt with bisphenol AF in ethanol at reflux for several hours, evaporating the solvent and drying the residue.

[3] The monomer perfluoro(2-phenoxypropyl vinyl ether) and the copolymer can be prepared in accordance with the teachings of copending application of Dexter B. Pattison, Ser. No. 621,122, filed Mar. 7, 1967. See especially Examples 3 and 5 thereof; however, the copolymer is preferably isolated by coagulation with MgCl$_2$ rather than by freezing the latex.

| Physical properties | A | B | C | D | E |
|---|---|---|---|---|---|
| Modulus at 100% elong. (p.s.i.) | 750 | 825 | 800 | 1,540 | 1,300 |
| Tensile strength at break (p.s.i.) | 1,350 | 1,300 | 900 | 3,070 | 1,850 |
| Elongation at break (percent) | 210 | 190 | 270 | 330 | 150 |
| Permanent set at break (percent) | 7 | 7 | 14 | 10 | 4 |

EXAMPLE 15

Procedure A is followed except as indicated below using the copolymer/crown I mixture of Example 13.

| Copolymer/crown mixture | 100 |
|---|---|
| Magnesium oxide | 10 |
| MT Carbon black | 20 |
| Sodium stearate | 0.5 |
| Hydroquinone, pulverized | 1.5 |

Mooney Scorch at 121° C. (Small rotor):

| Minimum | 50 |
|---|---|
| Minutes to 5 point rise | 10 |

Stress/strain at 24° C. after press and postcures:

| 100% modulus (p.s.i.) | 1081 |
|---|---|
| Tensile break (p.s.i.) | 1956 |
| Elongation at break (percent) | 150 |
| Hardness (Durometer A) | 73 |

Compression set Method B—percent after postcure at 204° C.:

| 70 hrs./24° C. | 4.4 |
|---|---|
| 70 hrs./204° C. | 32.4 |

EXAMPLE 16

Procedure A is followed except as indicated below using the copolymer of Example 3.

|   | A | B | C |
|---|---|---|---|
| Copolymer of Example 3 | 100 | 100 | 100 |
| Crown compound IV | 2 | 2 | 2 |
| MT carbon black | 30 | 20 | 20 |
| Magnesium oxide | 10 | 10 | 10 |
| Hydroquinone | 1.25 | 1.25 | 1.25 |
| Calcium hydroxide | 2 | 2 | 2 |
| Potassium stearate | 1 |  |  |
| Sodium benzoate |  | 1 |  |
| Potassium pentachlorothiophenolate |  |  | 2 |
| ODR at 163° C.—Torque, in. lbs.: |  |  |  |
|   5 minutes | 5 | 9 | 6 |
|   10 minutes | 10 | 21 | 9 |
|   20 minutes | 24 | 57 | 57 |
|   30 minutes | 39 | 78 | 76 |
| Stress/strain at 24° C.:[1] |  |  |  |
|   100% modulus (p.s.i.) | 590 | 820 | 670 |
|   Tensile strength at break (p.s.i.) | 2,200 | 2,150 | 2,300 |
|   Elongation at break (percent) | 210 | 190 | 230 |
|   Hardness (durometer A) | 70 | 71 | 70 |
| Compression set—ASTM D 395 Method B (percent): |  |  |  |
|   70 hours at 25° C. | 10 | 10 | 13 |
|   70 hours at 204° C. | 25 | 28 | 25 |

[1] After press and postcures.

What we claim is:

1. In the vulcanization of saturated, fluorinated elastomeric polymers, the improvement of adding to said polymers before vulcanization up to about 5 parts, per 100 parts of polymer, of a cyclic polyether consisting of about 4 to 10 —O—X— units and —O—Y— units wherein X and Y are divalent radicals independently selected from the group consisting of:

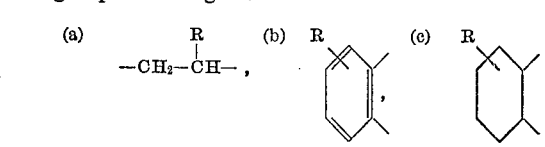

wherein R is hydrogen or methyl and wherein at least one of X and Y is (a).

2. The process as defined in claim 1 wherein said polymer is an interpolymer of tetrafluoroethylene and perfluoro(methyl vinyl ether) containing up to about 5 weight percent of units of perfluoro(2-phenoxypropyl vinyl ether).

3. The process as defined in claim 2 wherein said vulcanization is conducted in the presence of a basic divalent metal oxide and the potassium salt of bisphenol-AF.

4. The process as defined in claim 1 wherein said polymers are copolymers of vinylidene fluoride with at least one other fluorinated monomer copolymerizable therewith.

5. The process as defined in claim 4 wherein said vulcanization is an amine-based vulcanization conducted in the presence of a basic divalent metal oxide, said amine-based vulcanization employing a compound selected from the group consisting of aliphatic diamines, cycloaliphatic diamines, aromatic diamines, hydrazine and percursors for said compounds selected from carbamates, hydrochlorides, oxalates and hydroquinones.

6. The process defined in claim 4 wherein said compound selected is a cyclic polyether consisting of not more than 6 units and wherein X is (a) and Y is (b) or (c) and each —O—Y— unit is joined at both ends to a —O—X— unit.

7. The process defined in claim 4 wherein said compound is the cyclic polyether 2,5,8,15,18,21-hexaoxatricyclo[20.4.0.0$^{9,14}$]hexacosane.

8. A process as defined in claim 4 wherein said vulcanization is conducted in the presence of a basic divalent metal oxide and a polynucleophilic compound of the group (a) dihydroxy aromatic compounds, (b) lower aliphatic diols, (c) dithiols, (d) $H_3BO_3$, (e) sodium or barium carbonate and (f) sodium orthophosphate.

9. The process of claim 8 in which the polynucleophilic compound is employed in a weakly basic system resulting from adding 0.1–20 equivalents per equivalent of nucleophilic functional group of an alkali or alkaline earth metal salt of a carboxylic acid, phenol or thiophenol, or an alkali metal salt of an inorganic acid whose acid strength is similar to that of these organic acids.

10. The process of claim 8 in which the polynucleophilic compound is a hydroquinone and the weekly basic system employs sodium stearate in the amount of 0.1 to 20 equivalents per equivalent of —OH groups in the hydroquinone.

11. The process of claim 8 in which the polynucleophilic compound is a hydroquinone and the weakly basic system employs the potassium salt of pentachlorothiophenol in the amount of 0.1 to 20 equivalents per equivalent of —OH groups in the hydroquinone.

12. A vulcanizable, saturated, fluorinated elastomeric polymer containing up to about 5 parts, per 100 parts of polymer, of a cyclic polyether consisting of about 4 to 10 —O—X— units and —O—Y— units wherein X and Y are divalent radicals independently selected from the group consisting of:

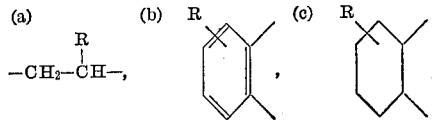

wherein R is hydrogen or methyl and wherein at least one of X and Y is (a).

13. A vulcanizable, saturated, fluorinated elastomeric polymer as defined in claim 12 wherein said polymer is a copolymer of vinylidene fluoride with at least one other fluorinated monomer copolymerizable therewith.

14. A vulcanizable, saturated, fluorinated elastomeric polymer as defined in claim 12 wherein said polymer is a copolymer of vinylidene fluoride and hexafluoropropene or a terpolymer of vinylidene fluoride, hexafluoropropene and tetrafluoroethylene.

15. A vulcanizable, saturated, fluorinated elastomer as defined in claim 12 wherein said polymer is an interpolymer of tetrafluoroethylene and perfluoro(methyl vinyl ether) containing up to about 5 weight percent of perfluoro(2-phenoxy-propyl vinyl ether).

16. A vulcanizable, saturated, fluorinated elastomeric polymer as defined in claim 12 wherein said compound selected is a cyclic polyether consisting of not more than 6 units and wherein X is (a) and Y is (b) or (c) and each —O—Y— unit is joined at both ends to a—O—X— unit.

17. A vulcanizable, saturated, fluorinated elastomeric polymer as defined in claim 16 wherein said compound selected is the cyclic polyether 2,5,8,15,18,21-hexaoxatricyclo[20.4.0.0$^{9,14}$]hexacosane.

References Cited

UNITED STATES PATENTS

| | | | |
|---|---|---|---|
| 2,968,649 | 1/1961 | Pailtrop | 260—80.77 |
| 2,979,490 | 4/1961 | West | 260—87.5 |
| 3,008,916 | 11/1961 | Smith | 260—41 |
| 3,023,187 | 2/1962 | Lo | 260—41 |
| 3,043,850 | 7/1962 | Guest | 260—340.7 |

JOSEPH L. SCHOFER, Primary Examiner

C. A. HENDERSON, JR., Assistant Examiner

U.S. Cl. X.R.

260—41, 79.5, 80.76, 80.77, 87.5, 87.7, 92.1, 338, 340.3